US011859723B2

(12) United States Patent
Surjaatmadja et al.

(10) Patent No.: US 11,859,723 B2
(45) Date of Patent: Jan. 2, 2024

(54) PUMP VALVE GUIDE FOR HYDRAULIC FRACTURING (71) Applicant: Halliburton Energy Services, Inc., Houston, TX (US)

(72) Inventors: Jim Basuki Surjaatmadja, Duncan, OK (US); Timothy Holiman Hunter, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 254 days.

(21) Appl. No.: 17/285,203

(22) PCT Filed: Dec. 14, 2018

(86) PCT No.: PCT/US2018/065703
§ 371 (c)(1),
(2) Date: Apr. 14, 2021

(87) PCT Pub. No.: WO2020/122938
PCT Pub. Date: Jun. 18, 2020

(65) Prior Publication Data
US 2021/0404568 A1 Dec. 30, 2021

(51) Int. Cl.
*F16K 15/06* (2006.01)
*E21B 43/26* (2006.01)
*E21B 43/267* (2006.01)
*F16K 27/02* (2006.01)

(52) U.S. Cl.
CPC ........ *F16K 15/065* (2021.08); *E21B 43/2607* (2020.05); *E21B 43/267* (2013.01); *F16K 27/0209* (2013.01)

(58) Field of Classification Search
CPC .. F16K 15/065; F16K 27/0209; F16K 15/063; F16K 15/028; E21B 43/2607; E21B 43/267; F04B 53/1022
See application file for complete search history.

(56) References Cited

U.S. PATENT DOCUMENTS

| 5,345,965 | A | * | 9/1994 | Blume | F16K 25/005 |
|---|---|---|---|---|---|
| | | | | | 137/902 |
| 5,755,259 | A | | 5/1998 | Schulze et al. | |
| 5,979,483 | A | | 11/1999 | Zapalac | |
| 9,903,493 | B2 | * | 2/2018 | Gardiner | E21B 34/02 |

(Continued)

FOREIGN PATENT DOCUMENTS

| EP | 0232858 A1 | 8/1987 | |
| EP | 1314921 A2 * | 5/2003 | ............. F16K 17/30 |

(Continued)

*Primary Examiner* — James G Sayre
(74) *Attorney, Agent, or Firm* — John Wustenberg; Parker Justiss, P.C.

(57) ABSTRACT

A valve guide for a fracturing pump valve assembly, the valve guide include a ring member having one or more blades. The one or more blades project inward from an annular ring of the ring member, a first side of the one or more blades defining a central space of the ring member, the central space configured to contain a cross-sectional portion of a valve post of the valve assembly therein and the first side extending parallel to a long axis length of the valve post. Valve assemblies and hydraulic fracturing systems including the valve guide are also disclosed.

23 Claims, 11 Drawing Sheets

(56) References Cited

U.S. PATENT DOCUMENTS

| | | | |
|---|---|---|---|
| 2003/0188783 A1* | 10/2003 | Vicars | F16K 15/063 |
| | | | 137/541 |
| 2009/0001308 A1 | 1/2009 | Dalo et al. | |
| 2009/0019664 A1 | 1/2009 | Abram | |
| 2009/0256098 A1 | 10/2009 | Pervaiz et al. | |
| 2010/0032607 A1 | 2/2010 | Takei et al. | |
| 2012/0141308 A1 | 6/2012 | Saini et al. | |
| 2014/0083534 A1* | 3/2014 | Blume | F04B 15/02 |
| | | | 137/565.01 |
| 2015/0060718 A1 | 3/2015 | Bell et al. | |
| 2016/0138731 A1 | 5/2016 | Foster | |
| 2016/0215588 A1* | 7/2016 | Belshan | F16K 1/38 |
| 2016/0273419 A1 | 9/2016 | MacVicar | |
| 2016/0327182 A1 | 11/2016 | Bareis et al. | |
| 2021/0048020 A1* | 2/2021 | Johnson | F04B 53/1027 |
| 2022/0065353 A1* | 3/2022 | Johnson | B21J 15/022 |

FOREIGN PATENT DOCUMENTS

| | | |
|---|---|---|
| EP | 1314921 B1 | 1/2006 |
| WO | 2005098197 A1 | 10/2005 |
| WO | 2020122938 A1 | 6/2020 |

\* cited by examiner

PUMP VALVE GUIDE FOR HYDRAULIC FRACTURING

CROSS-REFERENCE TO RELATED APPLICATION

This application is the National Stage of, and therefore claims the benefit of, International Application No. PCT/US2018/065703 filed on Dec. 14, 2018, entitled "PUMP VALVE GUIDE FOR HYDRAULIC FRACTURING," which was published in English under International Publication Number WO 2020/122938 on Jun. 18, 2020. The above application is commonly assigned with this National Stage application and is incorporated herein by reference in its entirety.

BACKGROUND

In the oil and gas industry, unconventional reservoirs often have a low-permeability rock matrix that impedes fluid flow, making it difficult to extract hydrocarbons (or other fluids of interest) at commercially-feasible rates and volumes. Often, the effective permeability of the formation can be increased by hydraulic fracturing using a proppant-ladened hydraulic fracturing slurry (fracturing slurry), pumped at a desired inlet downhole flow rate with the goal of keeping the fractures open after the fluid pressure is removed. Hydraulic fracturing slurry flow can be controlled by one or more pump valves located at the well site surface.

BRIEF DESCRIPTION

Reference is now made to the following descriptions taken in conjunction with the accompanying drawings, in which.

DETAILED DESCRIPTION

As part of the present invention we recognized that valve assemblies often use a valve guide that can be prone to sticking and thereby block the movement of the valve post of the valve assembly. In particular, we discovered that particles in the flowing proppant can get lodged in conventional tubular-shaped valve guide bushings surrounding the valve post, such that the valve cannot close. Additionally, we realized that such conventional valve guides can have smaller than desirable openings for proppant flow. This can cause higher proppant flow rates and greater flow resistance with subsequent greater rates of erosion, which in turn, can cause failure of the valve assembly.

As further disclosed below for various embodiments of the disclosure, we have developed a valve guide which have a central space to contain the valve post valve post therein. One or more blades of the valve guide are used to form the central space and the valve post is only partially surrounded to thereby mitigate proppant particles becoming stuck between the valve post and the value guide. Additionally, embodiments of the disclosed valve guide are configured to providing a larger cross-sectional area for hydraulic fracturing slurry flow through the valve assembly. Having a larger cross-sectional flow area reduces slurry flow rates, decreases flow resistance and increases valve reliability by decreasing the onset of erosion-caused valve failure.

In the drawings and descriptions that follow, like parts are typically marked throughout the specification and drawings with the same reference numerals, respectively. The drawn figures are not necessarily to scale. Certain features of this disclosure may be shown exaggerated in scale or in somewhat schematic form and some details of conventional elements may not be shown in the interest of clarity and conciseness. Specific embodiments are described in detail and are shown in the drawings, with the understanding that they serve as examples and that they do not limit the disclosure to only the illustrated embodiments. Moreover, it is fully recognized that the different teachings of the embodiments discussed, infra, may be employed separately or in any suitable combination to produce desired results.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

Figure 1:
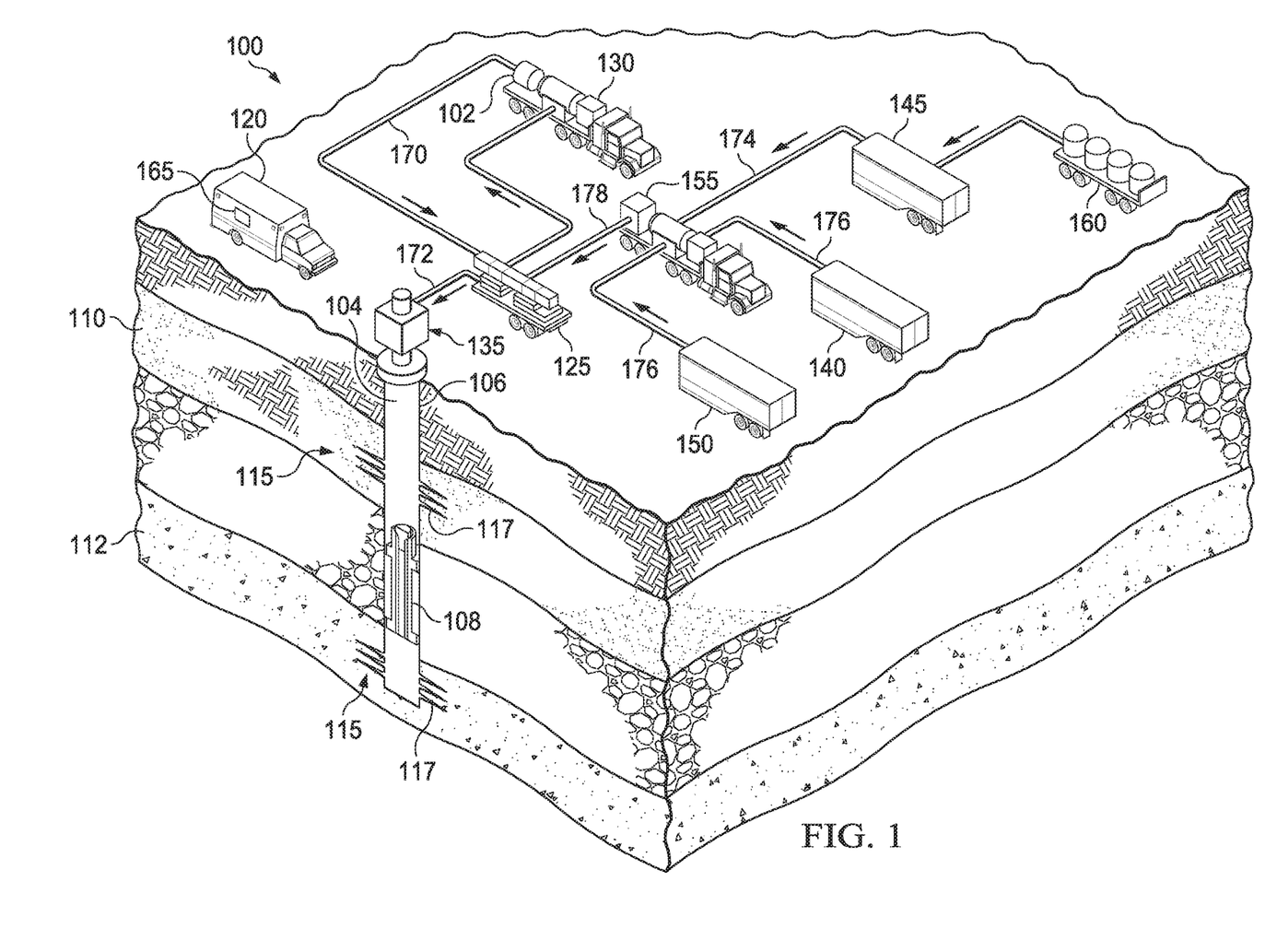
FIG. 1 presents a schematic, perspective view, with a portion in cross-section, of an illustrative embodiment of a well system where a hydraulic fracturing system including frac pump having a valve guide and valve assembly for controlling the proppant flow in accordance to embodiments of the disclosure are presented.

FIG. 1 presents a schematic, perspective view, with a portion in cross-section, of an illustrative embodiment of a well system, together with a hydraulic fracturing (fracing) system 100 for controlling the proppant flow by a hydraulic fracturing fluid pump (frac pump) that includes a valve assembly 102 and valve guide embodiments of the disclosure.

The wellbore 104 can include a casing 106 that is cemented or otherwise secured to a wall of the wellbore 104, although the wellbore 104 can be uncased or include uncased sections. A frac plug tool 108 can be positioned in the wellbore 104 to isolate discrete subterranean formation intervals 110, 112 for different fracture stages that have been identified or reached and a hydraulic fracturing operation may be used to create fractures 115 in the intervals 110, 112 to increase formation porosity for increasing the fluid conductivity of flow paths 117 between the formation intervals 110, 112 and the wellbore 104 to increase oil or gas production. Perforations can be formed in the casing 106 to allow fracturing fluids or slurries to flow into formation intervals 110, 112. The fracturing system 100 can include, among other things, an operation control unit 120, a manifold unit 125, a frac pump 130 (e.g., a truck-mounted frac pump), with one or more valve assemblies 102 of the disclosure being part of the pump 130. A wellhead tree 135 is present as part of the system 100 to cap the wellbore 104. The system 100 can include one or more of the following: proppant storage tank 140, fracturing fluid tank 145, other fracking component storage tank 150, and blender 155 (e.g. one or more blending trucks) and hydration apparatus 160 (e.g., coupled to the fluid tank 145).

One skilled in the pertinent art would understand how fracturing slurry fluid, pumped via the pump 130 into the wellbore 104 at a high a flow rate and pressure, through the valve 102, to increase the pressure in the wellbore 104, could be used as part of the system 100 to create or increase fractures 115 in the formation intervals 110, 112. For instance, the fracturing slurry fluid, including a hydrated gel, and/or resins (e.g., epoxy or other polymer resins) or composites thereof, can be pumped into the fractures 115 to prop the fractures in the formation open, to thereby, effectively increase the formation's porosity. One skilled in the pertinent art would understand how it would be desirable, to optimize the oil and gas extraction, to alter the composition of fracturing slurry fluids including proportion of proppants in slurry mixtures at different stages of hydraulic fracturing treatment using the system 100.

In some embodiments, the operation control unit 120 can be configured to coordinate the hydraulic fracturing operation, including controlling the flow though the valve assembly 102, and the frac pump 130, to deliver the fracturing slurry fluid to the wellbore 104 (e.g., via flow conduits 170, 172). The operation control unit 120 can be communication with the other system components and the frac pump 130 to monitor flow rates and pressures of the frac pump 130, the manifold unit 125 and the wellhead tree 135 and control the delivery rates of proppant at least in part by controlling the of fracturing slurry fluid through the valve assembly 102. A blender control unit 165 of the operation control unit 120 can be configured to control the delivery rates of proppants or other optional fracking components from corresponding tanks 140, 145, 150 to the blenders 155 by controlling flow through coupled to flow conduits (e.g., conduits 174, 176, 178) configured to deliver the corresponding components to the blender 155.

The term "proppant" as used herein refers to particulate solids which, during fracturing treatment of a reservoir formation, are blended with a fracturing fluid and transported downhole in a wellbore for placement within a fracture flow path to retain conductive channels in subterranean fractures through which fluids may travel. Suitable materials for proppants, can include but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite proppants may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

The term "fracturing fluid" as used herein refers to a base fluid and one or more optional additives. Such additives include, but are not limited to salts, weighting agents, inert solids, fluid loss control agents, emulsifiers, dispersion aids, corrosion inhibitors, emulsion thinners, emulsion thickeners, viscosifying agents, gelling agents, surfactants, particulates (such as proppant or gravel), lost circulation materials, foaming agents, gases, pH control additives, breakers, biocides, crosslinkers, stabilizers, chelating agents, scale inhibitors, gas hydrate inhibitors, mutual solvents, oxidizers, reducers, friction reducers, clay stabilizing agents, and the like, and any combination thereof. Suitable base fluids of the fracturing fluids include, but art not limited to, oil-based fluids, aqueous-based fluids, aqueous-miscible fluids, water-in-oil emulsions, or oil-in-water emulsions. The fracturing fluid may include dispersants to control agglomeration of the particulate solids, viscosity-enhancing additives to inhibit settling and modify flow behavior, and iron control agents to prevent the precipitation of metal oxides. Other chemicals and substances may be incorporated into the fracturing fluid in order to enhance fracture treatment of the reservoir formation.

The term hydraulic fracturing slurry fluid or "fracturing slurry" as used herein refers to a suspension of any the disclosed embodiments of proppants with any the disclosed embodiments of the fracturing fluid.

One embodiment is valve guide for a fracturing pump valve assembly.

Figure 2A:
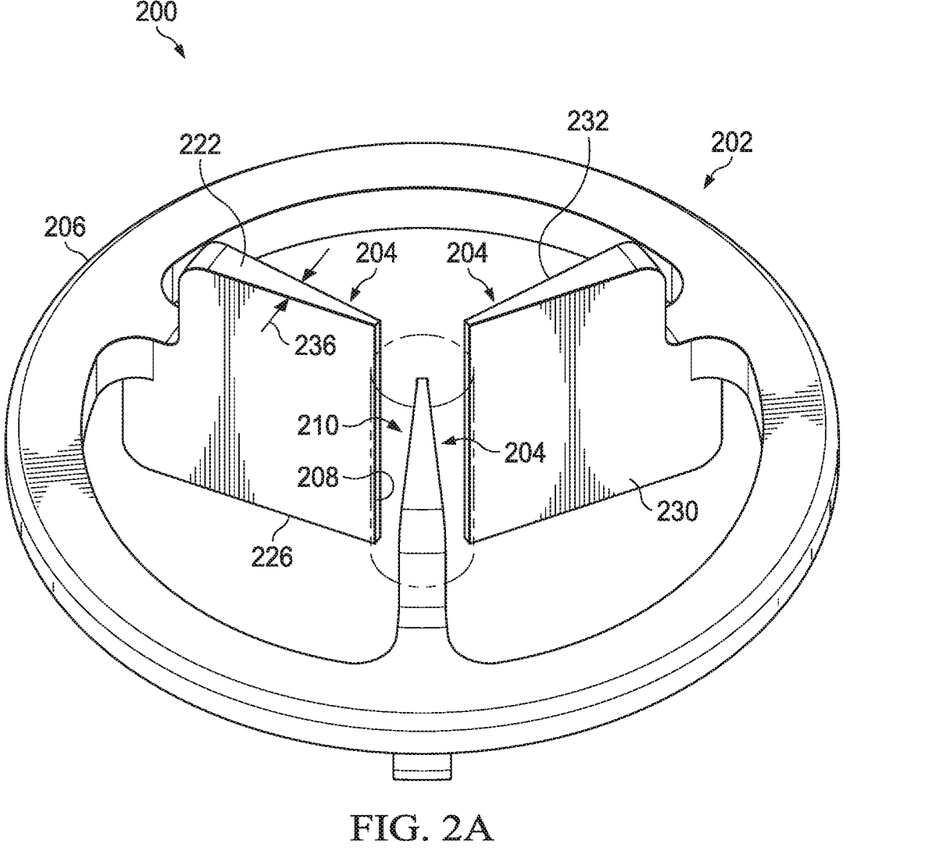
FIG. 2A presents a perspective view of an embodiment of the valve guide of the disclosure.
Figure 2B:
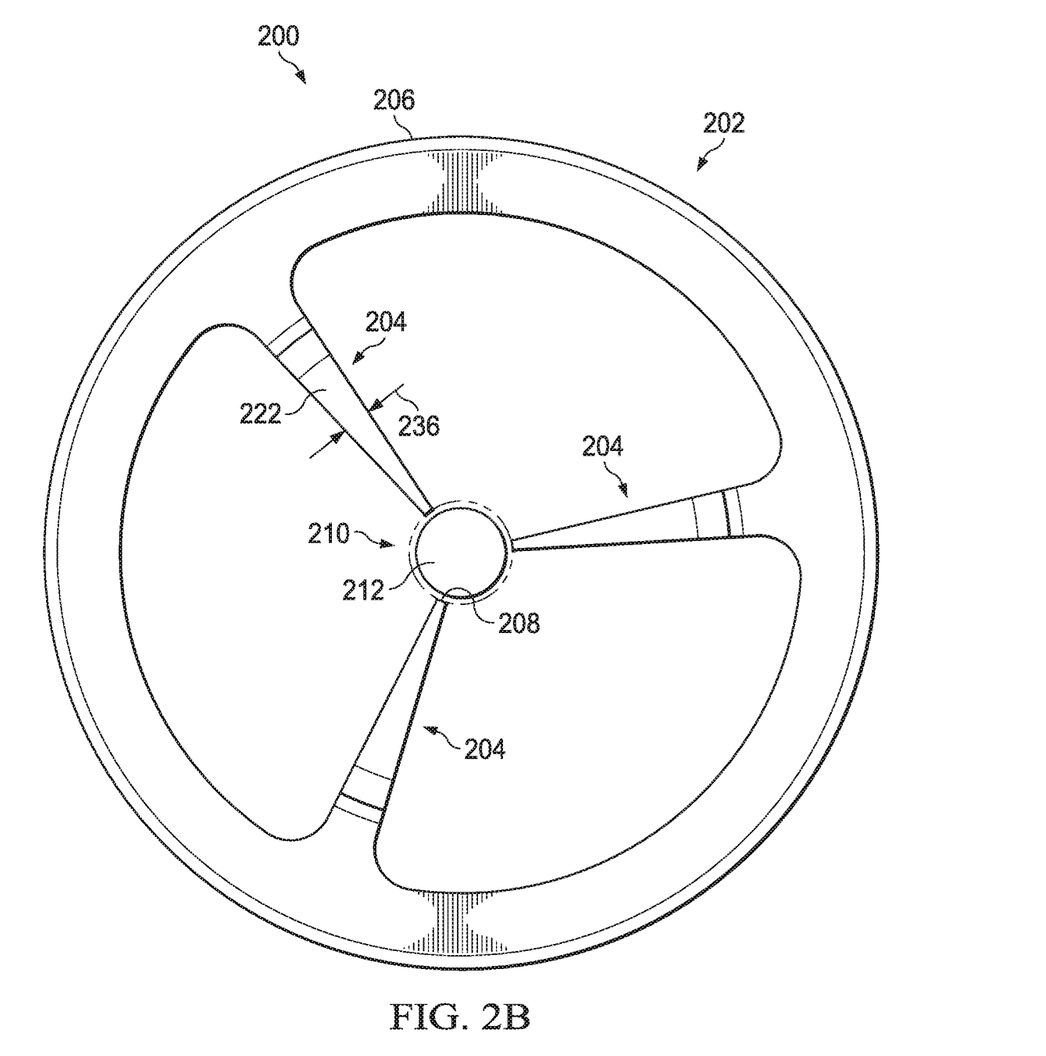
FIG. 2B presents a plan view of the valve guide embodiment, similar to that shown in FIG. 2A, with a cross-sectional portion of a valve post contained within a central space of the valve guide being depicted.
Figure 2C:
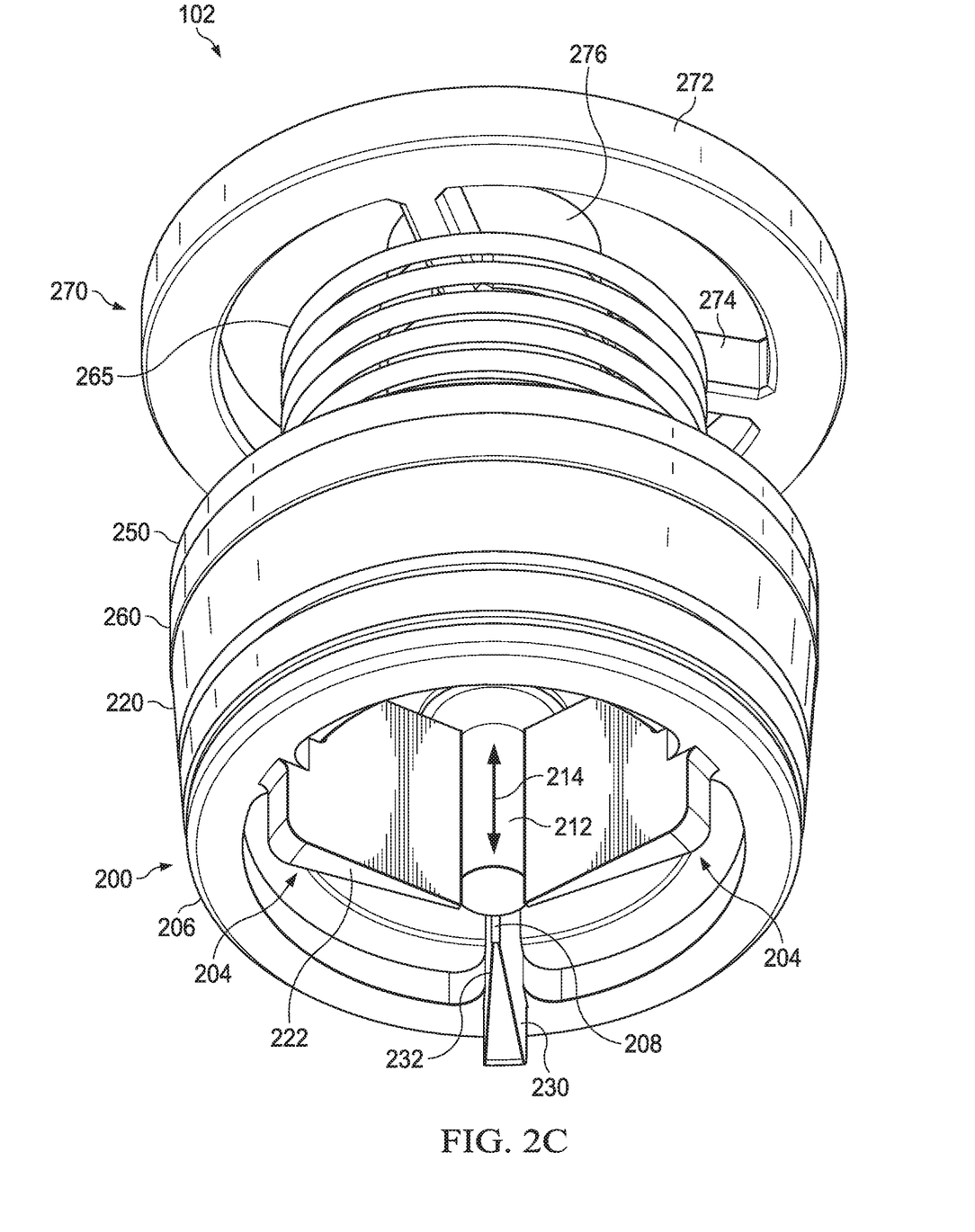
FIG. 2C presents a perspective view of the valve guide embodiment, similar to that shown in FIGS. 2A-2B, as part of a valve assembly embodiment of the disclosure.
Figure 2D:
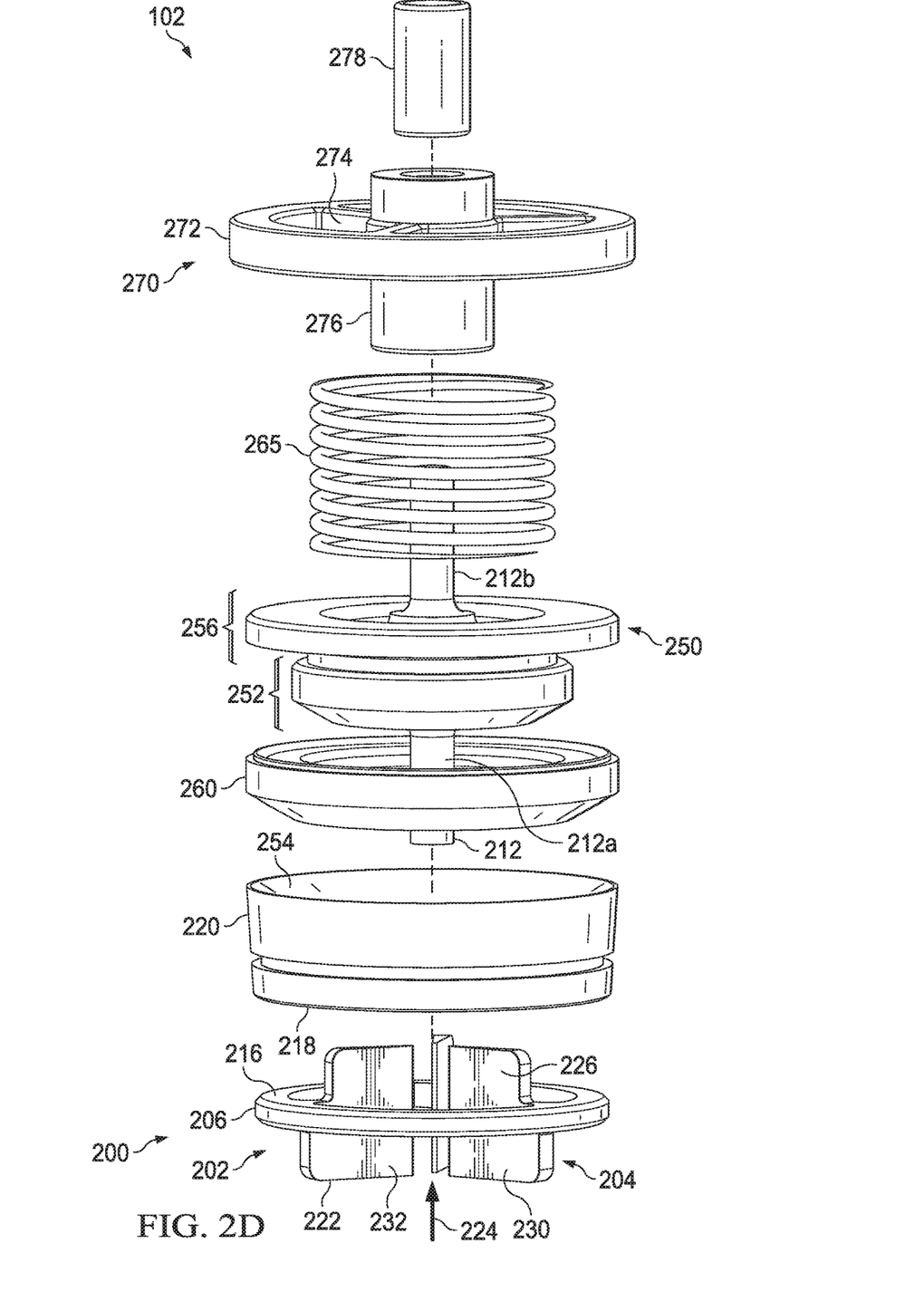
FIG. 2D presents an exploded view of the valve guide and valve assembly embodiments similar to that shown in FIG. 2C.
Figure 2E:
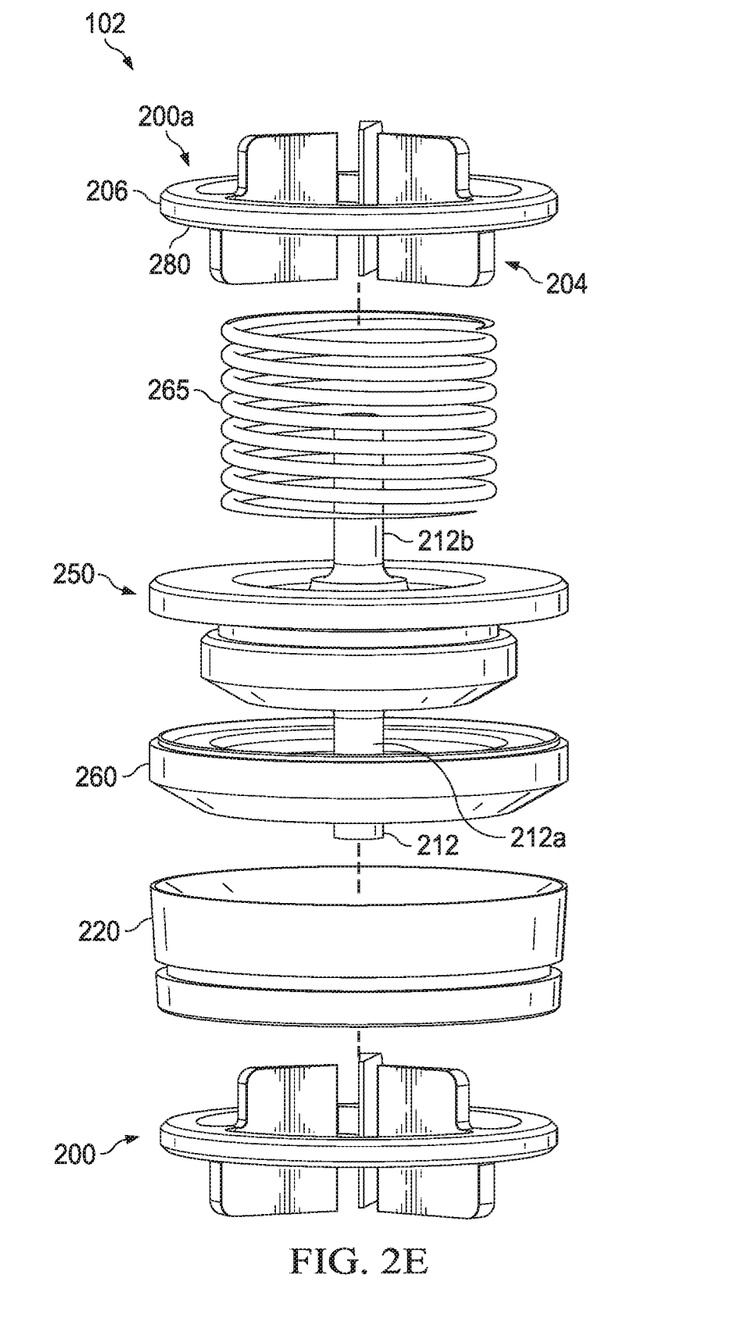
FIG. 2E presents an exploded view the valve guide embodiment and another valve assembly embodiment similar to that shown in FIG. 2D.

FIGS. 2A and 2B present perspective and plan views, respectively, of an embodiment of the valve guide 200 of the disclosure. FIG. 2C presents a perspective view of the valve guide embodiment, similar to that shown in FIGS. 2A-2B, as part of a valve assembly 102 embodiment of the disclosure. FIGS. 2D and 2E present exploded views of the valve guide 200 and valve assembly 102 embodiments similar to that shown in FIG. 2C.

With continuing reference to FIGS. 2A-2E throughout, embodiments of the value guide 200 include a ring member 202 having one or more blades 204. The one or more blades 204 project inward from an annular ring 206 of the ring member 202. A first side 208 of the one or more blades 204 defines a central space 210 of the ring member 202, the central space 210 configured to contain a cross-sectional portion of a valve post (e.g., cross-section of post 212 shown in FIG. 2B) of the valve assembly 102 therein. The first side 208 of each of the one or more blades 204 facing the central space 210 is configured to extend parallel to a long axis length 214 of the valve post 212.

As further explained below, previously unrecognized result-effective variables corresponding to the blade's shape, position, and orientation can be adjusted to optimize the cross-sectional flow area and decrease flow resistance while balancing the need to provide a valve guide structure capable of containing the valve post and still mitigate valve sticking.

In some embodiments, a planar surface 216 of the annular ring 206 is configured to rest adjacent to a planar surface 218 of a seat ring member 220 of the valve assembly 102. In some such embodiments, a second side 222 of each of the blades 204 facing an intake fracturing slurry flow direction 224 through the valve assembly 102 is located above the planar surface 216 (e.g., on a side of the surface 216 closest to the slurry intake) of the annular ring 206. In some such embodiments, a third side 226 of each of the blades 204 trailing the intake fracturing slurry flow direction 224 through the valve assembly 102 is located below the planar surface 216 (e.g., on a side of the surface 216 farthest from the slurry intake) of the annular ring 206.

In some embodiments, a fourth side 230 of each of the blades 204 is a major surface of the blade and the major surface is oriented parallel to an intake fracturing slurry intake flow direction 224 through the valve assembly 102, to thereby help reduce flow resistance and facilitate directing flow in the intake direction 224. Alternatively or additionally in some embodiments, a fifth side 232, corresponding to the opposite side of the blade 204 is also a major surface oriented parallel to the intake fracturing slurry intake flow direction 224. As illustrated, in some embodiments, the major surfaces of the fourth and/or fifth sides 230, 232 can include or be planar surfaces, although in other embodiments the fourth and/or fifth sides 230, 232 can include or be non-planar surfaces.

In some embodiments, the sides of each of the blades can be shaped to help reduce flow resistance.

For instance, as illustrated in FIGS. 2A-2B, the second side 222 and/or the third side 226 of the blades 204 facing/trailing the intake fracturing slurry flow direction 224 through the valve assembly can be tapered such that a width (e.g., width 236) of the second and/or third side and/or sides 222, 226 nearer the first side 208 is less (e.g., about 50%, 75%, or 90% less) than a width of the side or sides 222, 226 nearer the annular ring 206. As illustrated, in some embodiments, the width 236 of the side or sides 222, 226 can uniformly taper from the annular ring 206 to the first side 208, although in other embodiments, the tapering can be non-uniform.

Figure 3A:
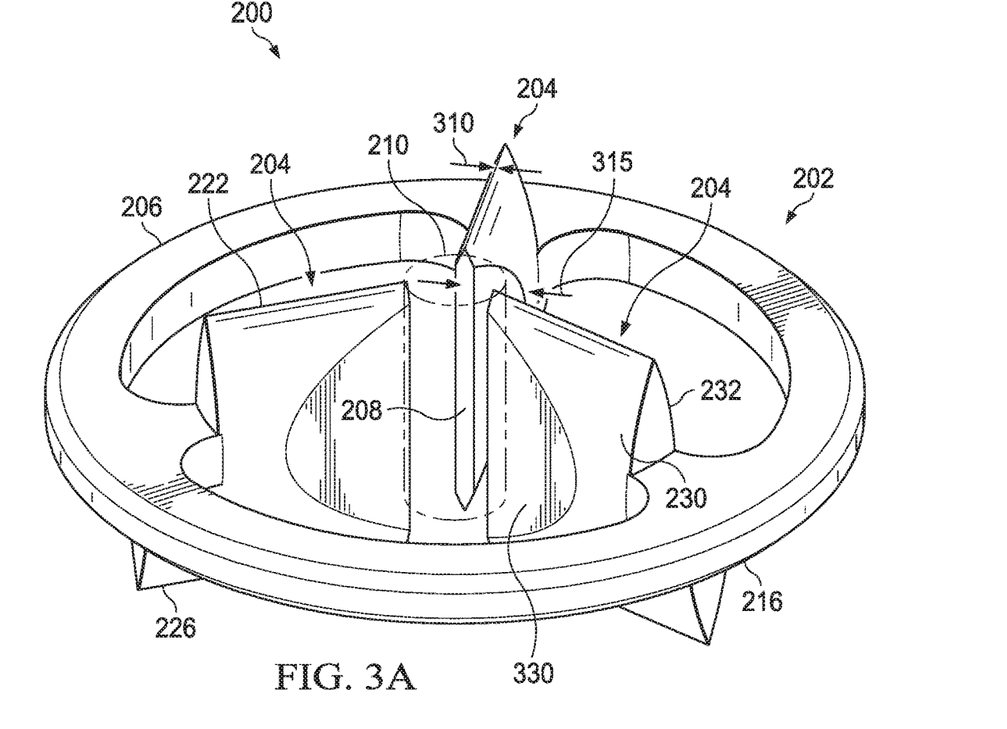
FIG. 3A presents a perspective view of another embodiment of the valve guide of the disclosure.
Figure 3B:
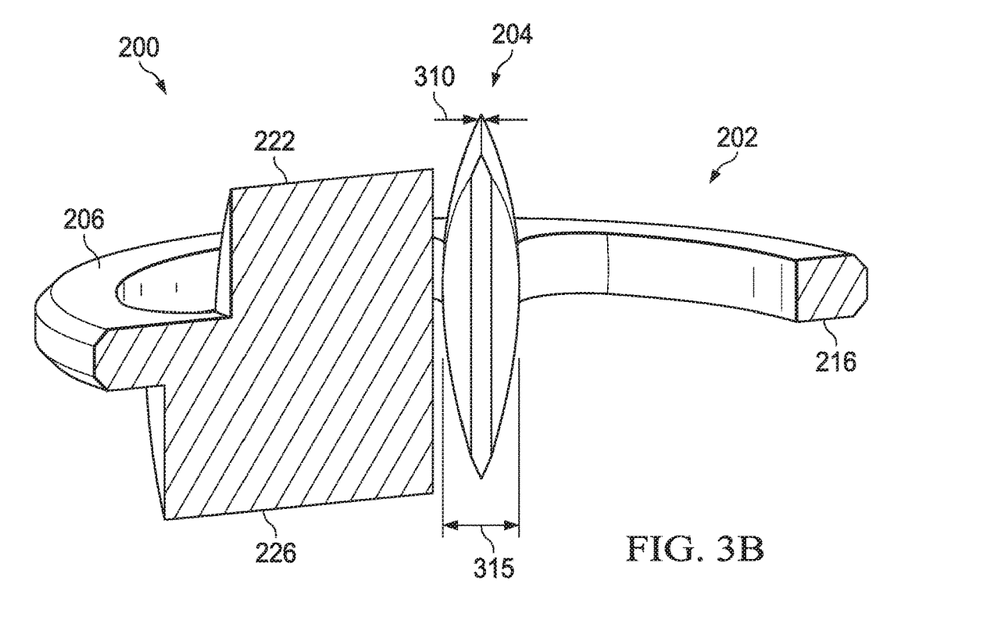
FIG. 3B presents a cut-away perspective cross-sectional view of the other valve guide embodiment, similar to that shown in FIG. 3A.
Figure 3C:
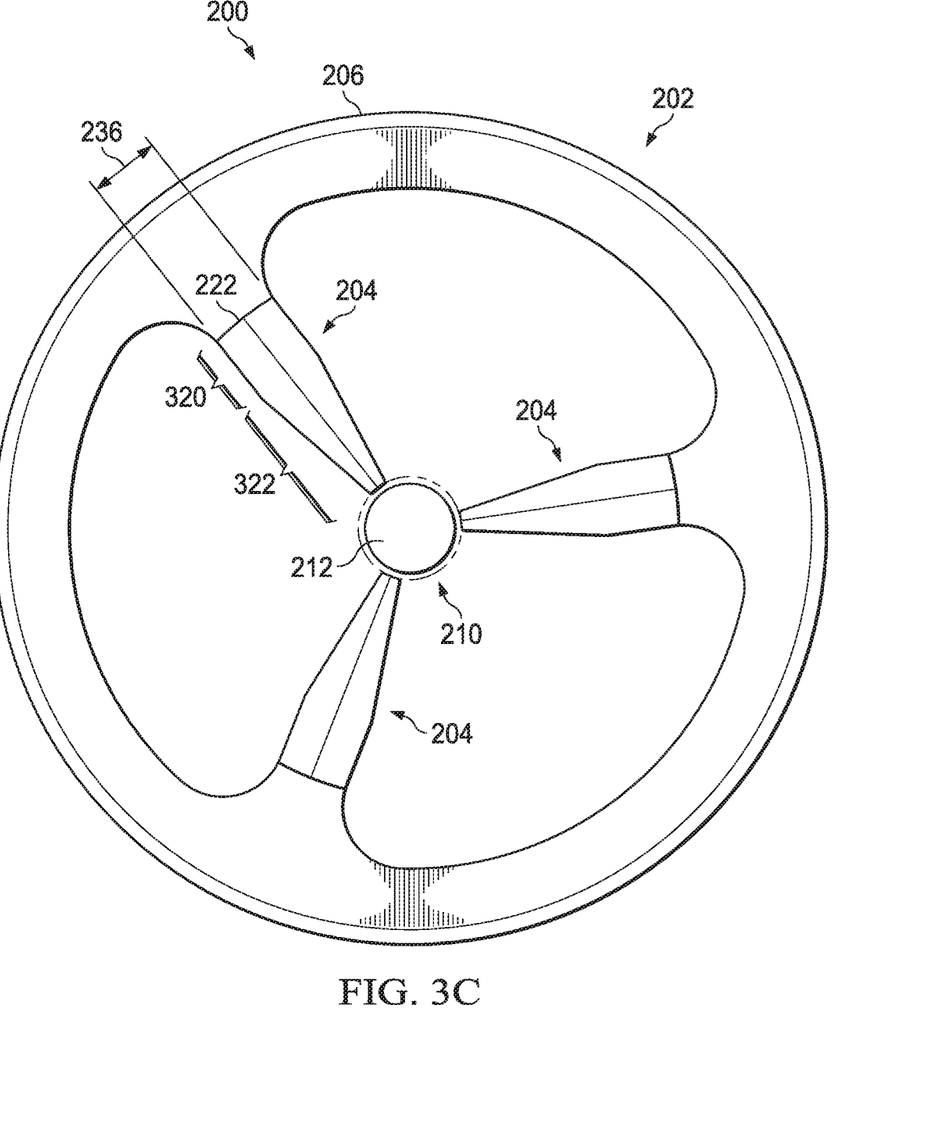
FIG. 3C presents a plan view of the other valve guide embodiment, similar to that shown in FIG. 3A, with a cross-sectional portion of a valve post contained within a central space of the valve guide being depicted.
Figure 3D:
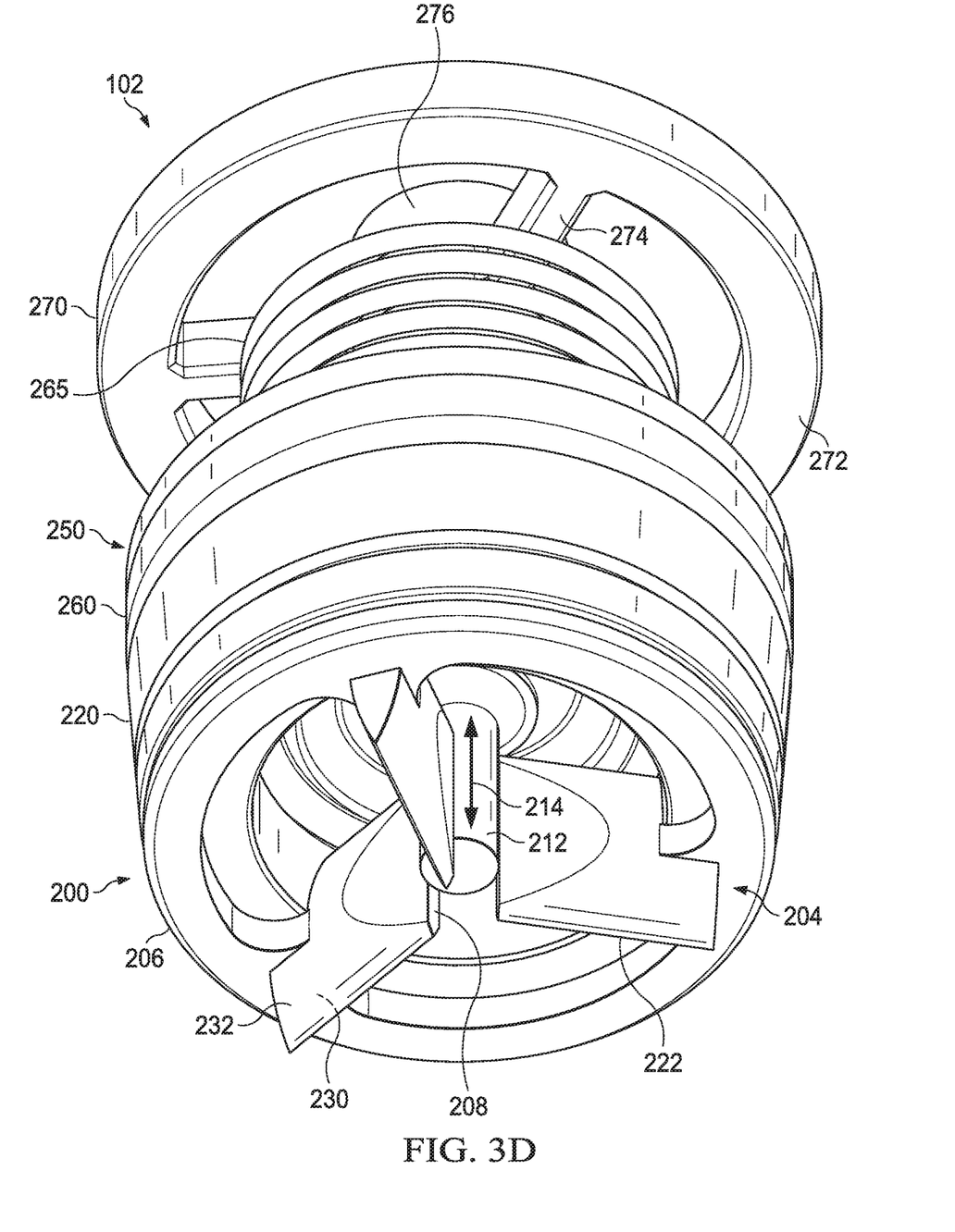
FIG. 3D presents a perspective view of the other valve guide embodiment, similar to that shown in FIGS. 3A-3C, as part of a valve assembly embodiment of the disclosure.

For instance, FIGS. 3A, 3B and 3C illustrate perspective view and plan views of another embodiment of the valve guide 200 of the disclosure with the blades 204 configured with additional aerodynamic features. FIG. 3D shows this other valve guide 200 embodiment as part of the valve assembly 102. As illustrated, the second and/or third side and/or sides 222, 226 facing/trailing the intake fracturing slurry flow direction 224 can be configured to have beveled edges such that a width at an edge of the side (e.g., width 310) is less (e.g., about 50%, 75%, 90%, or 99% less) than a width of a central portion of the blade 204 (e.g., width 315).

As further illustrated in FIG. 3C, in some embodiments, the second and/or third side and/or sides 222, 226 facing/trailing the intake fracturing slurry flow direction 224 can be configured to have a first portion 320 (e.g., a portion of the blade 204 nearest the ring 206) with a uniform width 236 and a second portion 322 (e.g., a portion of the blade 204 nearest the central space 210 with a tapering width 236, analogous to that described in the context of FIGS. 2A-2B.

As illustrated in FIG. 3A, the major surface or surfaces of the fourth and/or fifth sides 230, 232 of the blades 204 can include a chamfered, shaved or angled portion 330 to minimize amount of the side in the slurry flow direction 224.

FIGS. 4A-4D show plan views, similar to the views shown in FIGS. 2B and 3C, of other valve guide 200 embodiments.

Figure 4A:
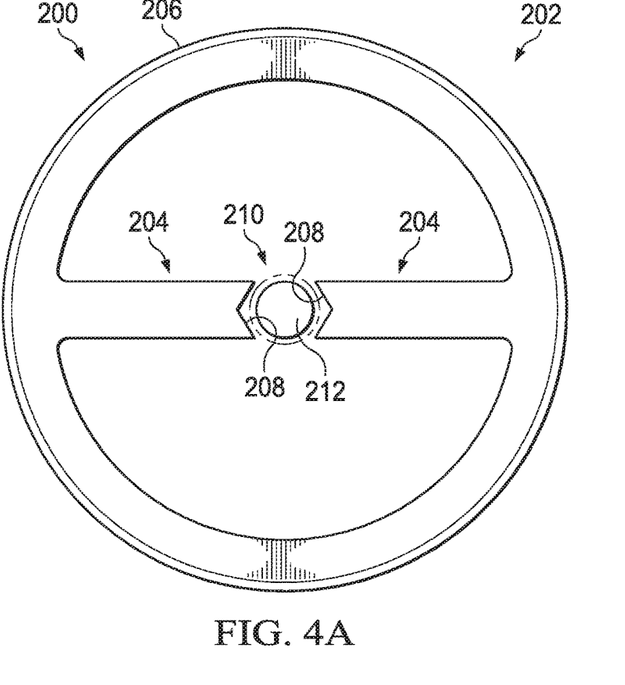
FIG. 4A-4D show plan views of the other valve guide embodiments similar to the plan views shown in FIGS. 2B and 3C.
Figure 4B:
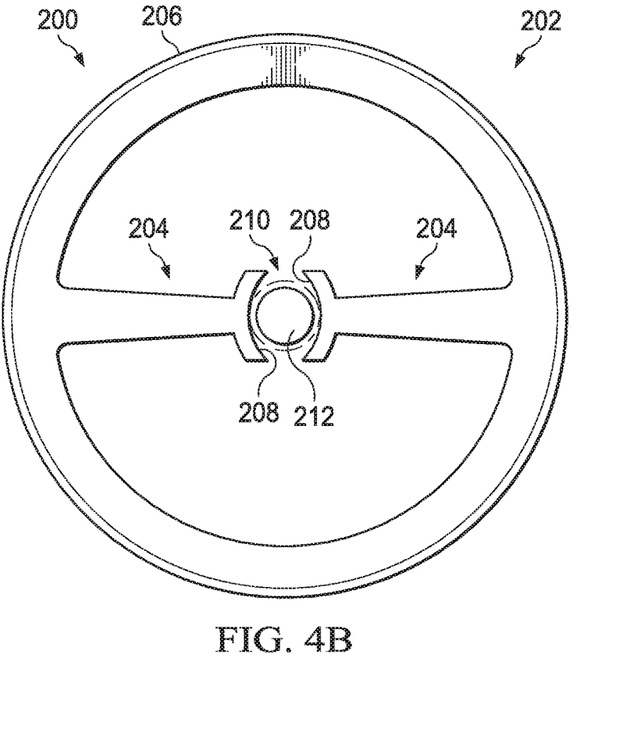

As illustrated in FIGS. 4A and 4B the one or more blades 204 of the valve guide 200 can be configured as a pair of blades. The first sides 208 of the pair of blades 204 are configured to, in combination, partially surround the cross-sectional portion of the valve post 212 and thereby define the central space 210. For instance, the first sides 208 of opposing blades can be configured to have V-shaped (FIG. 4A) or arc-shaped (FIG. 4B) structures to define the central space 210.

Figure 4C:
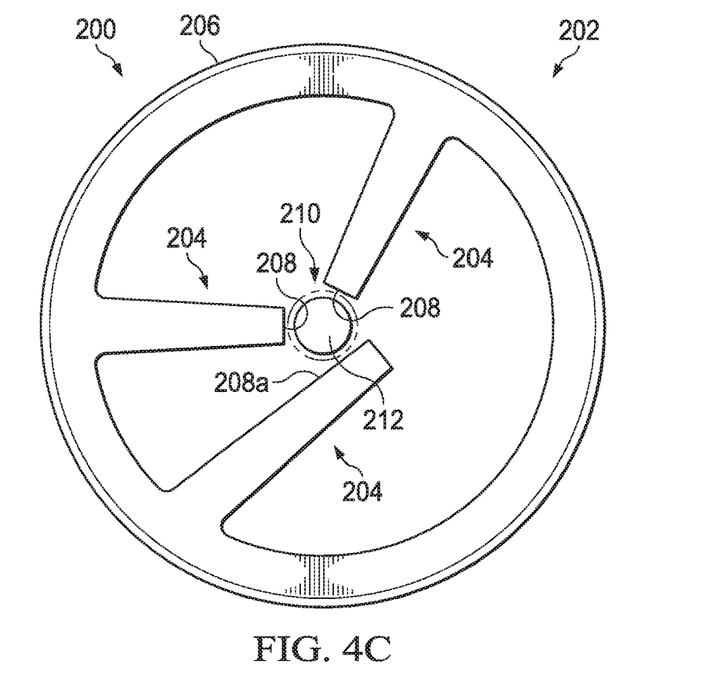

As illustrated in FIG. 4C, and also shown in FIGS. 2A-2E and 3A-3D, the one or more blades 204 of the valve guide 200 can be configured as three blades 204, with the first sides 208 of the three blades configured, in combination, to partially surround the cross-sectional portion of the valve post 212 and thereby define the central space 210. For instance, in some embodiments, such as shown in FIGS. 2A-2E and 3A-3D, the tips of blades can be the first sides define the central space 210. However, as shown in FIG. 4C, in some embodiments, one or more of the other non-tip sides (e.g., a blade side 208a having a major surface analogous to sides 230, 232 depicted in FIGS. 2A-2E and 3A-3D) of one or more of the blades 204 can be one of the sides that helps define the central space 210.

In some embodiments, as illustrated in FIGS. 2A-2E and 3A-3D, and 4A-4B the two or three blades 204 can be equally distributed around the annular ring 206, e.g., to provide a balanced blade structure. However, as shown in FIG. 4C, in some embodiments, the blades 204 can be asymmetrically distributed around the ring 206.

Figure 4D:
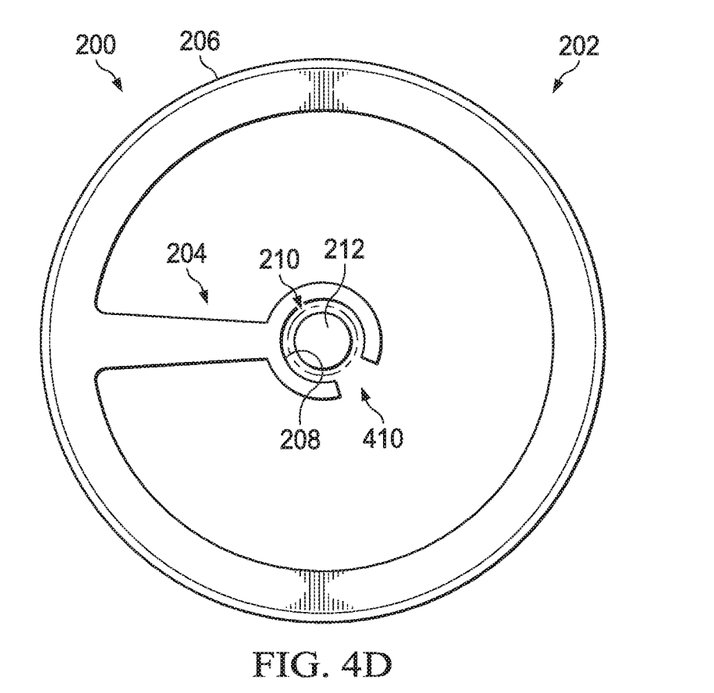

As illustrated in FIG. 4D, the one or more blades 204 of the valve guide 200 can be configured as a single blade where the first side 208 of the blade is configured to partially surround the cross-sectional portion of the valve post 212 to define the central space 210. For instance the side 208 of the blade can be configured as a partially enclosing bushing having a gap 410 is small enough to prevent the value post 212 from getting out of the central space 210 but large enough to allow the egress of slurry particles out of the central space 210.

While some two or one blade valve guide embodiments may beneficially provide a greater cross-section flow area as compared to three or greater blade embodiments, some three or greater blade embodiments may advantageously provide a more stable central space 210 with a lower chance of valve sticking as compared to one or two blade embodiments.

Based on the disclosed embodiments, one skilled in the pertinent arts would appreciate how embodiments of the valve guide 200 could be configured with one, two, three or greater blades, with the each of the blades having the same or different combinations of any of the blade configuration described in the context of FIGS. 2A-4D.

Some embodiments of the valve guide can be manufactured as cast or sintered monolithic structure composed of carbide or stainless steel to provide a structure that is resistance to erosion from the flow of high pressure slurries. However, other embodiments of the valve guide can be constructed by machining a block of material via computer numerical controlled (CNC) milling, additive machine processes (e.g., 3D printing) or similar procedures familiar to those skilled in the art. In still other embodiments, individual parts of the valve guide can be separately constructed and then welded or otherwise bonded together to form the valve guide.

Another embodiment is a valve assembly 102 for a fracturing pump. With continuing reference to FIGS. 2C, 2D and 3D, the valve assembly 102 can include a seat ring member 220 and a poppet 250. A plug-side 252 of the poppet 250 is configured to fit in an opening 254 of the seat ring member 220, e.g., when the valve assembly 102 is in a closed state to block slurry flow, and, the plug-side 252 of the poppet 250 is configured to be outside of the seat ring opening 254 when the valve assembly 102 is in an open state, to allow slurry flow through the valve assembly 102.

The assembly 102 also includes the valve post 212 and the valve guide 200. One section 212a of the valve post 212 extends through the plug-side 252 and an opposite section 212b of the valve post extends through a seat-side 256 of the poppet 250.

The valve guide of the assembly 102 can be any of the embodiments of the valve guide 200 described herein. For instance, the valve guide 200 can include a ring member 202 having one or more blades 204, wherein the one or more blades 204 project inward from an annular ring 206 of the ring member 202 with a first side 208 of the one or more blades 204 defining a central space 210 of the ring member 202. The central space 210 is configured to contain a cross-sectional portion of the valve post 212 and the first side 208 extends parallel to a long axis length 214 of the valve post 212 (e.g., extending 20, 40, 60, 80 or 100 percent of the length 214). For instance, a planar surface 216 of the annular ring can be configured to rest adjacent to a planar surface 218 of the seat ring member 220.

As illustrated, in some embodiments, the valve guide 200 is located on a side of the valve assembly 102 configured to receive the intake of fracturing slurry flow 224 through the valve assembly 102. E.g., the central space 210 can be configured to contain a cross-sectional portion corresponding to the section 212a of the valve post 212 that extends through the plug-side 252 of the poppet 250.

As further illustrated, embodiments of the valve assembly 102 can further include a ring gasket 260 (e.g., an elastomeric or other flexible gasket), a spring 265, and a second valve guide 270 located on a located on a discharge side of the assembly. The ring gasket 260 can be configured to be positioned between the seat ring member 220 and the poppet 250 such that a portion of the gasket 260 fits inside of the ring seat opening 254 and another portion is seated on the plug-side 252 of the poppet 250 when the assembly 102 is in a closed state, e.g., to facilitate forming a fluid seal to block slurry fluid flow through the assembly 102. The spring 265 can be configured to positioned between the poppet 250 and the second valve guide 270 such that the spring 265 rests against the seat ring opening 254 of the poppet 250 and against an annular ring 272 or spokes 274 of the second valve guide 270. One skilled in the art would understand how to provide sufficient tension on the spring 265 to keep the assembly in a closed state until pressure from the slurry flow 224 pushes on the poppet 250 and spring 265 to put the assembly in an open state.

As illustrated in FIGS. 2C, 2D and 3D, for some embodiments of the assembly 102, the second valve guide 270 can be configured to have a bushing 276 (and some embodiments, an inner bushing 278) configured to hold a section of the valve post 212 therein (e.g., section 212b of the valve post extending through the seat-side 256 of the poppet 250).

However, as illustrated in FIG. 2E, in other embodiments, to further mitigate valve sticking, the assembly 102 can alternatively further include a second one of the valve guides 200a located on a discharge side of the valve assembly 102. For instance, the one or more blades 204 of the second valve guide 200a can be configured to define a central space 210 configured to hold a cross-sectional portion of the opposite section 212b of the valve post 212 therein. Based on the present disclosure, one skilled in the art would understand how to adjust the size of the spring 265 and/or the size of the annular ring 206 and/or the position of the blades 204 relative to the ring 206 in the second valve guide 200a such that the spring 265 could rest against a planar surface 280 of the annular ring 206.

Another embodiment is a hydraulic fracturing well system. Returning to FIG. 1, embodiments of the system 100 can include a frac pump 130 coupled via flow conduits 170, 172 to a wellhead tree 135 capping a wellbore 104. The frac pump can be configured to deliver a fracturing slurry to the wellhead tree 135 and the frac pump can include one or more embodiments the valve assemblies 102 as disclosure herein. For instance, each valve assembly 102 can be include any of the embodiments of the seat ring member 220, poppet 250, valve post 212, or valve guide 200 and can further include any other components of the assembly 102 (e.g., gasket 260, spring 265, second valve guide 270, 200a) such as described in the context of FIGS. 2A-4D.

Those skilled in the art to which this application relates will appreciate that other and further additions, deletions, substitutions and modifications may be made to the described embodiments.

What is claimed is:

1. A valve guide for a fracturing pump valve assembly, the valve guide comprising:
    a ring member having one or more blades, wherein:
        the one or more blades project inward from an annular ring of the ring member, a first side of the one or more blades defining a central space of the ring member, the central space configured to partially surround and contain a cross-sectional portion of a valve post of the valve assembly therein and the first side extending parallel to a long axis length of the valve post, and
    the first side of the one or more blades define one or more gaps there-between to allow a fracturing slurry to flow there-through and prevent the valve post from passing out of the central space.

2. The valve guide of claim 1, wherein:
    a planar surface of the annular ring is configured to rest adjacent to a planar surface of a seat ring member of the valve assembly,
    a second side of each of the blades facing the fracturing slurry flow direction through the valve assembly is located above the planar surface of the annular ring, and
    a third side of each of the blades trailing the fracturing slurry flow direction through the valve assembly is located below the planar surface of the annular ring.

3. The valve guide of claim 1, wherein a fourth side of each of the blades is a major surface of the blade and the major surface is oriented parallel to the fracturing slurry intake flow direction through the valve assembly.

4. The valve guide of claim 1, wherein a second side of the blade facing the fracturing slurry flow direction through the valve assembly is tapered such that a width of the second side nearest the first side is less than a width of the second side nearest the annular ring, or, a third side of the blade trailing the fracturing slurry flow direction through the valve assembly is tapered such that a width of the third side nearest the first side is less than a width of the third side nearest the annular ring.

5. The valve guide of claim 1, wherein a second side of the blade facing the fracturing slurry flow direction through the valve assembly has a beveled edge such that a width of the second side is less than a width of a central portion of the blade.

6. The valve guide of claim 1, a third side of the blade trailing the fracturing slurry flow direction through the valve assembly has a beveled edge such that a width of the third side is less than a width of a central portion of the blade.

7. The valve guide of claim 1, wherein a second side of the blade facing the fracturing slurry flow direction through the valve assembly has a first portion nearest the ring with a uniform width and a second portion nearest the central space with a tapering width.

8. The valve guide of claim 1, a third side of the blade trailing the fracturing slurry flow direction through the valve assembly has a first portion nearest the ring with a uniform width and a second portion nearest the central space with a tapering width.

9. The valve guide of claim 1, wherein the one or more blades are configured as a pair of blades, the first sides of the pair of blades are configured to, in combination, partially surround the cross-sectional portion of the valve post and thereby define the central space and the one or more gaps.

10. The valve guide of claim 1, wherein the one or more blades are configured as three blades, the first sides of each the three blades configured, in combination, to partially surround the cross-sectional portion of the valve post and thereby define the central space and the one or more gaps.

11. The valve guide of claim 1, wherein the one or more blades is a valve guide, the valve guide including a ring member having one or more blades, wherein the one or more blades project inward configured as a single blade, the first side of the blade configured to partially surround the cross-sectional portion of the valve post.

12. The valve guide of claim 1, wherein at least 22 percent of the long axis length of the value post is moveable along a portion of the first side of the one or more blades.

13. A valve assembly for a fracturing pump, the valve assembly comprising:
a seat ring member;
a poppet, wherein a plug-side of the poppet is configured to fit in an opening of the seat ring member when the valve assembly is in a closed state and the plug-side is configured to be outside of the opening when the valve assembly is in an open state;
a valve post, wherein one section of the valve post extends through the plug-side and an opposite section of the valve post extends through a seat-side of the poppet; and
a valve guide, the valve guide including a ring member having one or more blades, wherein the one or more blades project inward from an annular ring of the ring member, a first side of the one or more blades defining a central space of the ring member, the central space configured to partially surround and contain a cross-sectional portion of the valve post and the first side extending parallel to a long axis length of the valve post, and
the first side of the one or more blades define one or more gaps there-between to allow a fracturing slurry to flow there-through and prevent the valve post from passing out of the central space.

14. The valve assembly of claim 13, wherein the valve guide is located on a side of the valve assembly configured to receive an intake of the fracturing slurry flow through the valve assembly.

15. The valve assembly of claim 13, further including a second one of the valve guides, the central space configured to hold a cross-sectional portion of the opposite section of the valve post therein, the second one of the valve guides located on a discharge side of the valve assembly.

16. The valve assembly of claim 13, wherein the one or blades are configured as three or more blades, the first sides of each the three or more blades positioned in combination to partially surround the cross-sectional portion of the valve post.

17. The valve assembly of claim 13, wherein a second side of each of the blades facing the fracturing slurry flow direction through the valve assembly is shaped to have a tapered edge.

18. The valve assembly of claim 13, wherein a second side of each of the blades facing the fracturing slurry flow direction through the valve assembly is located above the planar surface of the annular ring and a third side of each of the blades trailing a discharge fracturing slurry flow direction through the valve assembly is located below the planar surface of the annular ring.

19. The valve assembly of claim 13, wherein a third side of each of the blades trailing a discharge fracturing slurry flow direction through the valve assembly is shaped to have an tapered edge.

20. The valve assembly of claim 13, wherein a fourth side of each of the blades is a major surface of the blade and the major surface is oriented parallel to the intake fracturing slurry intake flow direction through the valve assembly.

21. The valve assembly of claim 13, wherein the value post is moveable along the long axis length within the central space defined by the first side of the one or more blades.

22. A hydraulic fracturing system, comprising:
a frac pump coupled via flow conduits to a wellhead tree capping a wellbore, the frac pump configured to deliver a fracturing slurry to the wellhead tree, wherein the frac pump includes one or more valve assemblies, each of the valve assemblies including:
a seat ring member;
a poppet, wherein a plug-side of the poppet is configured to fit in an opening of the seat ring member when the valve assembly is in a closed state and the plug-side is configured to be outside of the opening when the valve assembly is in an open state;
a valve post, wherein one section of the valve post extends through the plug-side and an opposite section of the valve post extends through a seat-side of the poppet; and
from an annular ring of the ring member, a first side of the one or more blades defining a central space of the ring member, the central space configured to partially surround and contain a cross-sectional portion of the valve post and the first side extending parallel to a long axis length of the valve post, and the first side of the one or more blades define one or more gaps there-between to allow a fracturing slurry to flow there-through and prevent the valve post from passing out of the central space.

23. The hydraulic fracturing system of claim 22, wherein the value post is moveable along the long axis length within the central space defined by the first side of the one or more blades.

* * * * *